J. DYMOCK.
MACHINE FOR THE MANUFACTURE OF PAPER TWINE.
APPLICATION FILED JUNE 2, 1908.

919,332.

Patented Apr. 27, 1909.

Witnesses
Alfred Bosshardt
Stanley Bramall

Inventor,
John Dymock
Per F. Bosshardt,
Attorney.

UNITED STATES PATENT OFFICE.

JOHN DYMOCK, OF STOCKPORT, ENGLAND.

MACHINE FOR THE MANUFACTURE OF PAPER TWINE.

No. 919,332.    Specification of Letters Patent.    Patented April 27, 1909.

Application filed June 2, 1906. Serial No. 319,881.

*To all whom it may concern:*

Be it known that I, JOHN DYMOCK, subject of Great Britain, residing at Stockport, in the county of Chester, Kingdom of Great Britain, have invented new and useful Improvements in Machines for the Manufacture of Paper Twine, of which the following is a specification.

This invention relates to improvements in that type of machines for the manufacture of twine from paper in ribbon form in which the paper coming from the reel is damped or furnished with adhesive material and before being twisted is curled by passing through a hollow conical tube.

The object of my invention is to so arrange and combine the said hollow cone with a grooved guide roller or pulley, a pair of delivery rollers and a liquid supply trough, that the strength and appearance of the twine is greatly improved thereby and the cost of manufacture reduced there being practically no waste.

I attain these objects by the means illustrated in the accompanying drawing, in which—

Figure 1:
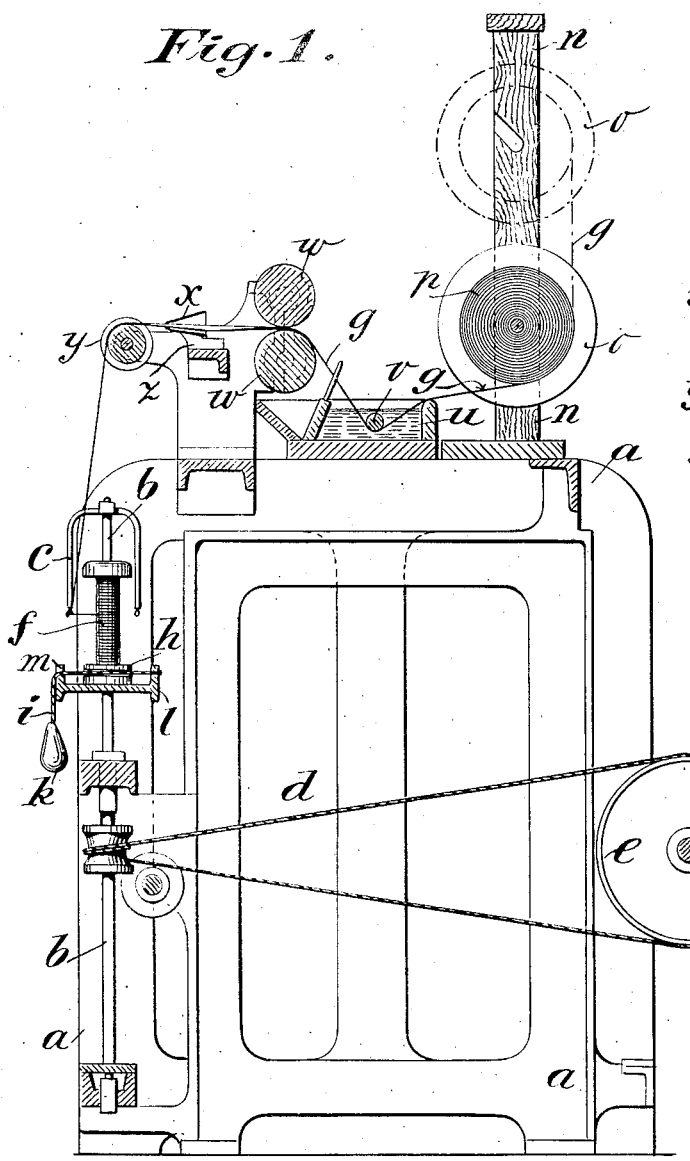
Figure 2:
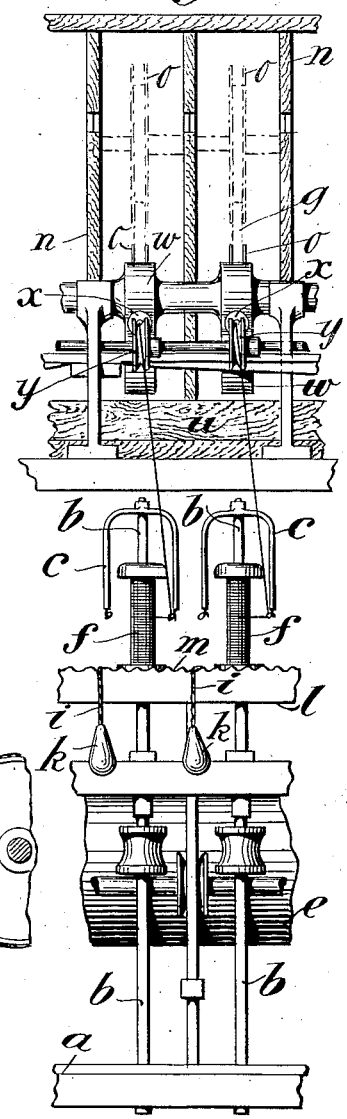

Figure 1 is a vertical cross section and Fig. 2 a front view of a machine constructed in accordance with my invention. Figs. 3, 4 and 5 are views of details.

Similar letters refer to similar parts throughout the several views.

Figure 3:
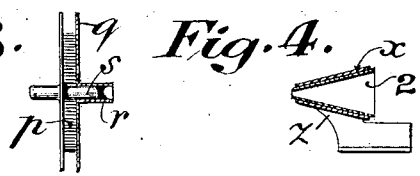

In carrying out my invention and referring to the Figs. 1 and 2, I construct a suitable frame $a$ in which I mount one or more rows of vertical spindles $b$ each furnished with a flier $c$ and rotated at a suitable speed by means of a band $d$ from a drum $e$. Each of these spindles is adapted to carry a spool or tube $f$ adapted to rotate therewith through frictional contact and be raised and lowered by a rail $l$. The said spool or tube is placed under the influence of a brake which serves to retard its rotation sufficiently to give the flier $c$ the required lead to wind the paper ribbon $g$ from which the twine is made on the spool or tube $f$. These brakes may each consist of a disk or pulley $h$ secured to or formed on the spool or tube $f$ and of a band $i$, held in frictional contact therewith by a weight $k$ (or weights, or its equivalent) the amount of which contact may be increased and the flier thus given more lead as the diameter of the twine around the spool or tube $f$ increases. For this purpose the front edge of the spool or tube lifting rail $l$ has recesses $m$ to receive the weight band $i$ and thereby allow of bringing it more or less around the spool or tube disk or pulley $h$. In connection with each of the said spindles I employ behind or at the back of the frame of the machine in a creel $n$, a spool $o$ containing a roll of paper $p$ in ribbon form from which the twine is made. This spool may rotate freely on a rod, or as in the present instance have pivots mounted in the creel $n$ and a flange on each side to support and thereby keep the layers of the paper roll $p$ together. One or both of the said flanges may be made readily removable to facilitate the placing of the paper roll upon the spool, for instance as shown in Fig. 3, by forming the removable flange $q$ with a hollow pivot $r$ to fit onto a pivot $s$ of the fixed flange.

Figure 4:
Figure 5:

From the paper roll $p$, Figs. 1 and 2, the ribbon $g$ passes first through a damping or sizing trough $u$ under a rod $v$ therein, then through a pair of feed rollers $w$ and afterward to a curling device. This curling device consists of a hollow cone $x$ in connection with a V-grooved roller or pulley $y$ mounted above the spindle $b$. The paper ribbon $g$ enters this cone at its wide end and is emitted at its narrow end in a curled condition, that is to say, with edges raised and curled inward by the said cone and thus partly prepared for being twisted. The ribbon $g$ then passes over the V grooved roller or pulley $y$ which presses together its raised and inwardly curled edges and thus finally prepares the ribbon for being twisted, at the same time serving as a lateral guide for the delivery to the spindle flier $c$. The ribbon thus curled and pressed together is then gradually twisted in passing from the said V-grooved roller or pulley to the said flier onto the spool or tube $f$ on the spindle. I may here remark that by pressing together by the said V-grooved roller or pulley the inwardly curled ribbon edges before twisting the ribbon they are prevented from fraying and the twine is thus rendered much stronger. The cone $x$ is formed on a bracket $z$ secured to the frame of the machine and may be arranged interchangeable or adapted to receive other cones 2, as shown in Figs. 4 and 5, the narrow end of which extends through the respective end of the cone $x$ so as to allow of varying the size thereof in accordance with the width of the ribbon used for the twine.

In lieu of using only one paper ribbon two or more may be twisted together, in which case two or more rolls of paper are employed one above the other in connection with each spindle, see full and dotted lines Figs. 1 and 2, the said ribbons passing through the same curling cone.

I claim:

1. In a machine for the manufacture of paper twine, a hollow cone for raising and curling inward the edges of the ribbon, a V-grooved roller rotating in a vertical plane in front of the said cone with groove coinciding with the outlet orifice of the latter and receiving the said ribbon to press its inwardly curled edges and sides together and a flier for twisting the said curled ribbon, all substantially as and for the purpose set forth.

2. In a machine for the manufacture of paper twine, a hollow cone for raising and curling inward the edges of the ribbon, a V grooved roller rotating in a vertical plane in front of the said cone with groove coinciding with the outlet orifice of the latter and receiving the said ribbon to press its inwardly curled edges and sides together, a pair of feed rollers, a damping trough and a rod therein, the ribbon passing underneath the latter through the said trough and then between the said rollers by which it is fed into the said cone, all combined substantially as and for the purpose set forth.

3. In a machine for the manufacture of twine from paper ribbon, in combination with a hollow internally conical fixed ribbon curling member, an auxiliary interchangeable hollow externally and internally conical ribbon curling member, in the fixed member the narrow end of which extends through the latter, substantially as and for the purpose specified.

In testimony whereof I have signed my name to this specification in the presence of two subscribing witnesses.

JOHN DYMOCK.

Witnesses:
ALFRED BOSSHARDT,
STANLEY E. BRAMALL.